United States Patent [19]
Wanderscheid et al.

[11] Patent Number: 5,602,582
[45] Date of Patent: Feb. 11, 1997

[54] METHOD AND SYSTEM FOR PROCESSING A REQUEST BASED ON INDEXED DIGITAL VIDEO DATA

[75] Inventors: Tammy M. Wanderscheid, Highland Ranch; Martin D. Siebring; Kurt P. Haldeman, both of Aurora, all of Colo.

[73] Assignee: U S West Marketing Resources Group, Inc., Engelwood, Colo.

[21] Appl. No.: 344,305

[22] Filed: Nov. 22, 1994

[51] Int. Cl.⁶ .................................................. H04N 7/173
[52] U.S. Cl. ............................ 348/12; 348/13; 455/4.2; 455/5.1
[58] Field of Search ...................... 348/6, 7, 8, 12, 348/13, 4; 455/3.1, 3.2, 4.2, 5.1, 6.1, 6.2, 6.3; 395/155, 161; H04N 7/10, 7/173, 7/16

[56] References Cited

U.S. PATENT DOCUMENTS

| | | |
|---|---|---|
| 4,025,851 | 5/1977 | Haselwood et al. ........................ 348/4 |
| 5,253,053 | 10/1993 | Chu et al. . |
| 5,438,355 | 8/1995 | Palmer ..................................... 348/13 |

FOREIGN PATENT DOCUMENTS 0617563  3/1994  European Pat. Off. .

OTHER PUBLICATIONS

The Networked Video Jukebox, IEEE Transactions on Circuits and Systems for Video Technology, L. Crutcher and J. Grinham, Apr. 4, 1994, pp. 105–120.

Interactive video on Demand, IEEE Communications Magazine, D. Deloddere, W. Verbiest, and H. Verhille, May 1994, pp. 82–88.

An Open–Systems Approach to Video on Demand, IEEE Communications Magazine, Yee–Hsiang Chang et al., May 1994, pp. 68–80.

European Search Report, EP 95 11 6390, dated Feb. 13, 1996, The Hague.

*Primary Examiner*—David E. Harvey
*Attorney, Agent, or Firm*—Brooks & Kushman

[57] ABSTRACT

A method is disclosed for processing an input signal related to streamed digital video data. The method is directed to an interactive media network employing a client-server architecture. The method begins with initializing a counter. The counter may represent an elapsed time or a frame number. Next, the client station receives streamed digital video data representing multimedia information. The counter is then updated and the multimedia information represented by the streamed digital video data is displayed. Next, the input signal representing a user request is received at the user station. An index based on the value of the counter is then determined, and the method concludes by transferring execution control based on the index. A system is also disclosed for processing the steps of the above-described method.

18 Claims, 2 Drawing Sheets

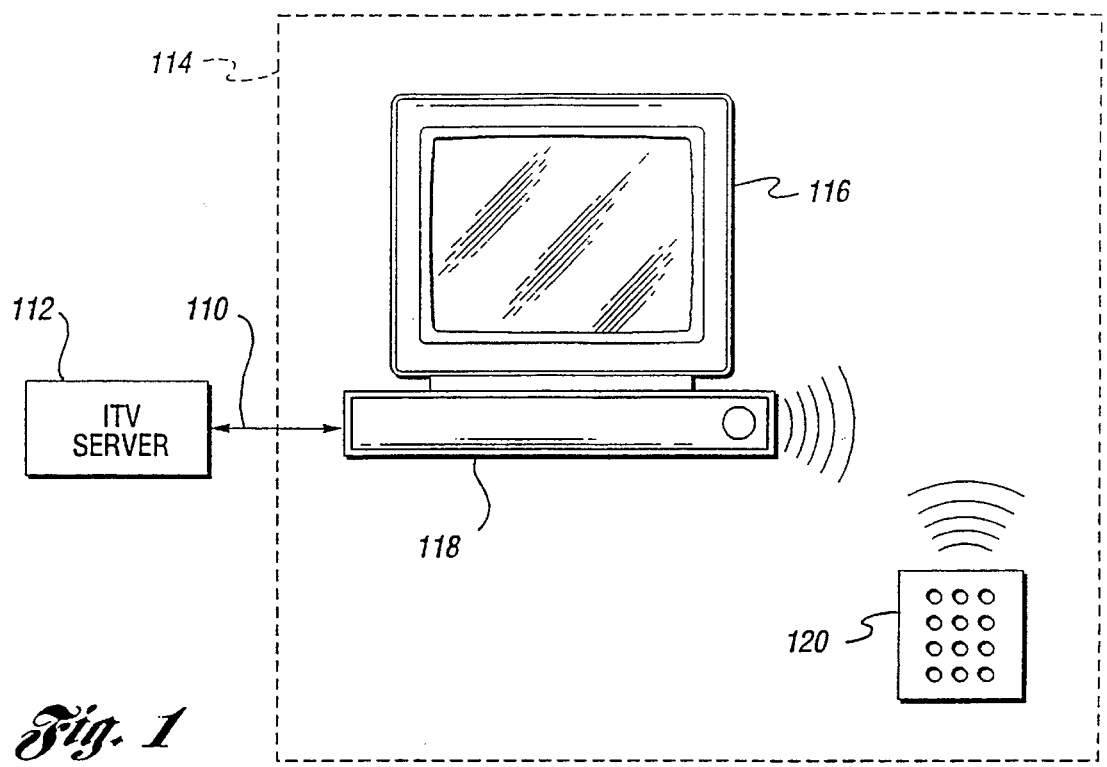
Fig. 1
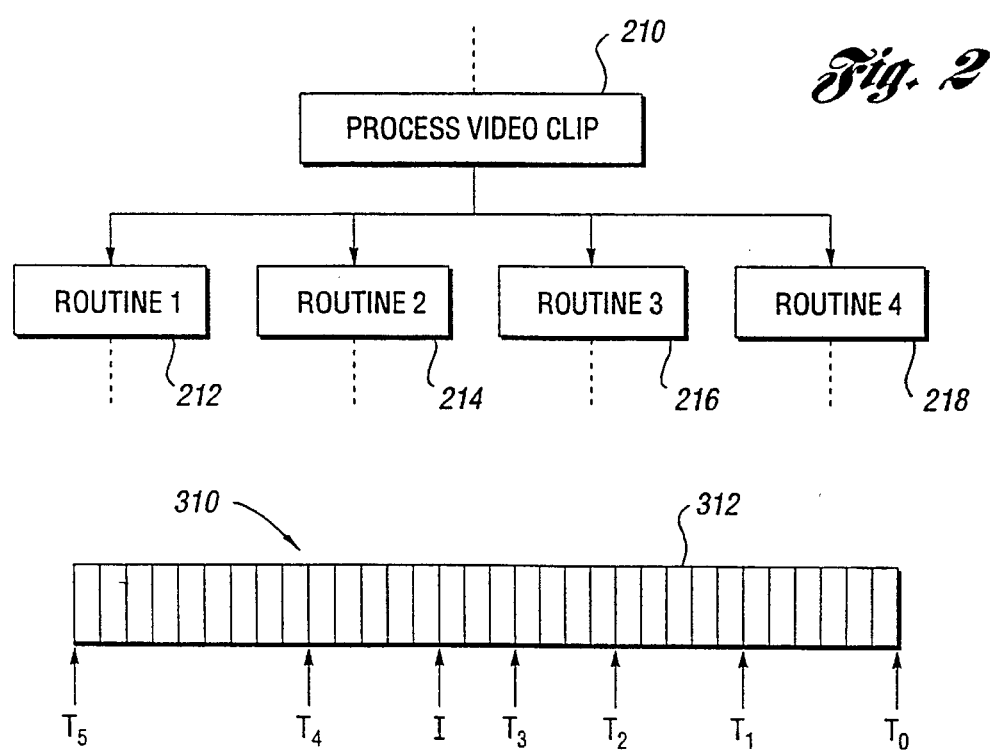
Fig. 2
Fig. 3

| TIME INDEX | BATCH INSTRUCTION |
|---|---|
| $T_1$ | JUMP TO ROUTINE 1 |
| $T_2$ | JUMP TO ROUTINE 2 |
| $T_3$ | JUMP TO ROUTINE 1 |
| $T_4$ | JUMP TO ROUTINE 3 |
| $T_5$ | JUMP TO ROUTINE 4 |

Fig. 4

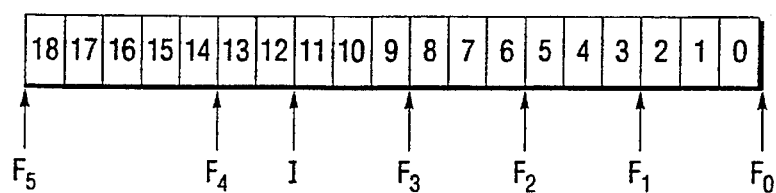

Fig. 5

| FRAME INDEX | BATCH INSTRUCTION |
|---|---|
| $F_1$ | JUMP TO ROUTINE 1 |
| $F_2$ | JUMP TO ROUTINE 2 |
| $F_3$ | JUMP TO ROUTINE 1 |
| $F_4$ | JUMP TO ROUTINE 3 |
| $F_5$ | JUMP TO ROUTINE 4 |

Fig. 6

| FRAME INDEX | USER BUTTON | BATCH INSTRUCTION |
|---|---|---|
| $F_1$ | 1 | JUMP TO ROUTINE 1 |
| $F_1$ | 2 | JUMP TO ROUTINE 2 |
| $F_1$ | 3 | JUMP TO ROUTINE 3 |
| $F_1$ | 4 | JUMP TO ROUTINE 4 |
| $F_2$ | 1-4 | JUMP TO ROUTINE 2 |
| $F_3$ | 1-4 | JUMP TO ROUTINE 1 |
| $F_4$ | 1-4 | JUMP TO ROUTINE 3 |
| $F_5$ | 1-4 | JUMP TO ROUTINE 4 |

Fig. 7

METHOD AND SYSTEM FOR PROCESSING A REQUEST BASED ON INDEXED DIGITAL VIDEO DATA

TECHNICAL FIELD

This invention relates generally to methods and systems for processing user requests during a multimedia presentation. In particular, this invention relates to methods and systems for dynamically transferring program control based on an input signal received during a multi-media presentation.

BACKGROUND ART

Methods for digitally representing video signals have existed for at least 30 years. Digital representations of video signals typically require a very large number of bits.

For example, uncompressed digital video data representing sixty seconds of video requires approximately 1.6 gigabytes of digital storage. Sixty seconds of compressed video can be stored in approximately 20 megabytes. Generally, the widespread use of digital video data in interactive applications has been limited by the massive amount of storage required for such data.

Recent advances in not only video compression algorithms but also manufacturing processes relating to digital storage devices have made digital video data available for an increasing number of applications. One such application is interactive media.

The concept of interactive television, for example, has existed for many years. However, only recently, with the availability of digital video data, have a number of small interactive television networks been developed. These interactive television networks utilize compressed digital video data which is indexed to ensure synchronization between the visual and audio aspects of a video clip.

Typically, interactive television networks provide a user with the ability to select functions using a remote control or similar pointing device. During the presentation of a video clip, the user is limited to a predetermined and static set of functions from which to select. At any time during the presentation of a video clip, regardless of the content of the video clip, the user may select a function. Program control is accordingly transferred to a routine based on the selected function.

Dynamic functionality, however, is not presently available to users of such interactive television networks. In other words, the set of available functions does not change during a contiguous stream of digital video data. As a result, the selections available to a user are fixed throughout the display of a video clip.

Consequently, a need has developed for an improved method and system for processing a user request which, unlike the prior art, is related to streamed digital video data. More particularly, a need has developed for a method and system for processing a user request in an interactive media network which supports a dynamic set of functions based on an indexing of a video clip.

DISCLOSURE OF THE INVENTION

The present invention disclosed and claimed herein comprises a method and system for processing an input signal representing a user request related to indexed digital video data in an interactive media network such as an interactive television network.

It is therefore an object of the present invention to provide a method and system for processing an input signal representing a user request related to digital video data which is indexed based on either time or frame number.

It is another object of the present invention to provide a method and system for processing an input signal representing a user request which can be used in many different applications and environments of such interactive media networks.

In carrying out the above objects and other objects, features and advantages of the present invention, a method is provided for processing an input signal representing a user request related to streamed digital video data. The method is directed for use in an interactive media network such as, for example, an interactive television network which includes a server and at least one client station. Each client station includes a processor, a memory and an input device, such as an infra-red remote controller.

The method begins with the step of initializing a timer. The method also includes the step of transmitting streamed digital video data from the server to a client station. The digital video data represents a video clip to be displayed on the monitor of the client station. The method further includes the step of displaying the streamed digital video data on the monitor of the client station.

The method continues with the step of receiving a signal from the input device of the client station. The input signal represents a user request related to the video displayed on the monitor of the client station. The method next includes the step of determining an index based on the timer. Finally, the method includes the step of transferring execution control to an appropriate routing based on the value of index.

In further carrying out the above objects and other objects, features and advantages of the present invention, a second preferred method is provided for processing an input signal related to streamed digital video data. The method includes the step of initializing a frame counter. The method also including the step of receiving streamed digital video data at a user station. The method further including the steps of updating the frame counter and displaying the streamed digital video data on the monitor of the user station.

The method continues with the step of receiving the input signal from the input device. The input signal represents a user request related to the video displayed on the monitor of the client station. The method concludes with the steps of determining an index based on the frame counter and transferring execution control to an appropriate routine based on the value of index.

In further carrying out the above stated objects, features and advantages of the present invention, a system is also provided for carrying out the steps of the above described methods.

The objects, features and advantages of the present invention are readily apparent from the detailed description of the best mode for carrying out the invention when taken in connection with the accompanying drawings.

BRIEF DESCRIPTION OF THE DRAWINGS

A more complete appreciation of the invention and many of the attendant advantages thereof may be readily obtained by reference to the following detailed description when considered with the accompanying drawings in which reference characters indicate corresponding parts in all of the views, wherein:

FIG. 1 is a schematic block diagram of the environment in which the present invention is used;

FIG. 2 is a flowchart of a program segment related to processing user input received during the presentation of a video clip;

FIG. 3 is a functional block diagram of streamed digital video data indexed based on time;

FIG. 4 is a lookup table used in association with time indexed streamed digital video data;

FIG. 5 is a functional block diagram of streamed digital video data indexed based on frame number;

FIG. 6 is a lookup table used in association with frame number indexed streamed digital video data; and FIG. 7 is a lookup table used in association with indexed streamed digital video data and a remote control button index.

BEST MODES FOR CARRYING OUT THE INVENTION

Referring now to the drawings, FIG. 1 is a schematic block diagram illustrating an interactive media system for use with the present invention. The system is shown as an interactive television system and includes an interactive television ("ITV") server 112 for use in an interactive television network. ITV server 112 is provided in electrical communication with Customer Premises Equipment ("CPE") device 114 of the subscriber over communication line 110. Communication line 110 is preferably, but not necessarily, a fiber optic cable.

The preferred CPE device 114 of the present invention is a Time Warner full service network Home Communications Terminal ("HCT"). The HCT employs a MIPS R4000 chip running at 80–100 Mhz and incorporates Silicon Graphics Indigo Workstation components. The HCT is designed to receive digital full motion video, animation, graphics and audio. The HCT is further designed to convert this digital information into an analog signal for transmission to monitor 116.

CPE 114 includes a display device or monitor 116. To provide the highest resolution, display device 116 is preferably a video monitor however, a standard television is acceptable. CPE 114 further includes interactive television controller 118 having a processor and memory. CPE 114 also includes input device 120. Preferably input device 120 is an infrared remote control including a number of alpha-numeric keys to facilitate user selection. Alternatively, input device 120 could be an infrared mouse.

As those skilled in the art will recognize, system 10 is an interactive television network employing a client-server architecture. ITV server 112 provides mass storage and services to CPE 114. Control logic resides at both server 112 and CPE 115 to support the client-server architecture.

Although the preferred embodiment will be described for use in an interactive television environment, the present invention is equally well-suited to a CD-ROM interactive system, a stand alone kiosk for use in a public facility, or any other such interactive multi-media information system. In addition, it is envisioned that the method of the present invention is well-suited to a variety of input devices. The method of the present invention is envisioned to operate with a touch sensitive screen, joy stick, mouse, or other conventional input device.

Referring now to FIG. 2, there is illustrated a flowchart of a program segment related to processing user input received during the presentation of a video clip. Block 210 represents the steps associated with processing and presenting the video clip. These processing steps include receiving streamed digital video data at the client CPE 114; presenting video information at monitor 116; identifying a user request input using input device 120; and transferring execution to an appropriate routine based on the identified user input and the portion of the video data being presented at the time of the user input.

Blocks 212–218 represent processing steps associated with routines responsible for processing user requests. As indicated above, these routines assume execution control based on the identified user input and the portion of the video data being presented at the time of the user input.

Referring now to FIG. 3, there is shown a diagram illustrating time indexed streamed digital video data. The data stream representing a video clip is generally referred to by reference numeral 310. The data stream comprises data blocks representing video frames. A block of data representing a single frame is illustrated by reference numeral 312.

Time index $T_0$ identifies the beginning of the data stream 310. Time indices $T_1$–$T_5$ identify relevant transition points within the video clip. These indexed transition points may relate to a change in subject matter, audio/video instructions, or any other change which would necessitate an alternative input signal processing routine.

As an example, data stream 310 might represent a video clip promoting merchandise in a women's clothing store. The portion of the video clip from $T_0$ to $T_1$ might be a segment which generally introduces the merchandise of the store. The second segment of the video clip from $T_1$ to $T_2$ might describe a first department within the store, such as an accessories department. The third segment of video clip 310 between $T_2$ and $T_3$ might describe a second department within the store, such as a clothing department. The fourth segment of video clip 310 between $T_3$ and $T_4$ might describe a third department within the store, such as a jewelry department. The final segment of video clip 310 between $T_4$ and $T_5$ might describe a fourth department within the store, such as a footwear department.

A user input signal is identified during data stream 310 at time I. Upon receiving the input signal from remote controller 120, CPE 114 will determine a time index based on I.

Referring now to FIG. 4, there is illustrated a look-up table used in association with the time indexed streamed digital video data. Continuing the previous example, the input signal is received by CPE 114 at time I between $T_3$ and $T_4$. Accordingly, CPE 114 uses $T_4$ to index into the look-up table of FIG. 4. Preferably, the timer and the look-up table reside in the memory of CPE 114.

After the look-up is performed, CPE 114 executes a branch instruction associated with the $T_4$ entry. In this example, a user generated input signal received by CPE at time I would result in CPE 114 transferring execution control to routine 3. The branch instruction could incorporate any execution transfer programming technique. Examples include case and switch statements, if-then-else statements and GOTO statement.

Referring now to FIG. 5, there is shown a diagram illustrating frame indexed streamed digital video data. The data stream representing a video clip is generally referred to by reference numeral 510. The data stream comprises data blocks representing video frames. A block of data representing a single frame is illustrated by reference numeral 512.

Frame index $F_0$ identifies frame O, the first frame of the data stream. Frames can be indexed as either intra picture frames or predicted picture frames without adversely effecting the results of the invention. Frame indices $T_1$–$T_5$ identify relevant transition points within the video clip. These indexed transition points are similar to those shown in FIG. 3 except that they are identified by frame number instead of time.

As in the previous example, streamed digital data 510 might represent a video clip promoting merchandise in a women's clothing store. The portion of video clip 510 from $F_0$ to $F_1$ might be a segment which introduces the merchandise of the store. The second segment of video clip 510 from $F_1$ to $F_2$ might describe a first department within the store, such as an accessories department. The third segment of video clip 510 between $F_2$ and $F_3$ may describe a second department within the store, such as a clothing department. The fourth segment of video clip 510 between $F_3$ and $F_4$ might describe a third department within the store, such as a jewelry department. The final segment of video clip 510 between $F_4$ and $F_5$ might describe a fourth department within the store, such as a footwear department.

A user input signal is identified during data stream 510 at frame I. Upon receiving the input signal from remote controller 120, CPE 114 will determine a frame index based on I.

Referring now to FIG. 6, there is illustrated a look-up table used in association with the frame indexed streamed digital video data. As shown in FIG. 5, the input signal is received by CPE 114 at frame I between $F_3$ and $F_4$. Accordingly, CPE 114 uses $F_4$ to index into the look-up table shown in FIG. 6. Preferably, the timer and the look-up table reside in the memory of CPE 114.

After the look-up is performed, CPE 114 executes a branch instruction associated with $F_4$. In this example, a user generated input signal received by CPE at time I would result in CPE 114 transferring execution control to routine 3. The branch instruction could incorporate any execution transfer programming technique. Examples include case and switch statements, if-then-else statements and GOTO statements.

Referring now to FIG. 7, there is illustrated a look up table having two indices: a frame index, and a user button index. A look up table such as this can be used in embodiments providing functionality for several buttons during a video clip segment.

As illustrated during the video clip segment ending at frame index $F_1$, buttons 1–4 are associated with different processing routines. For video segments associated with frame indices $F_2$–$F_5$, buttons 1–4 are associated with the same processing routine.

While the best modes for carrying out the invention has been described in detail, those familiar with the art to which this invention relates will recognize various alternative designs and embodiments for practicing the invention as defined by the following claims. Using a look up table employing multiple indices provides an application developer the ability independently alter the functionality of any button of remote controller 120 at any frame index during the video clip.

What is claimed is:

1. In an interactive media network including a server and a client station, the client station including a processor, a memory and an input device, a method for processing an input signal from the input device relating to streamed digital video data, the method comprising:

initializing a timer;

transmitting streamed digital video data from the server to the client station, the streamed digital video data representing multimedia information and having a plurality of execution control routines associated therewith;

displaying the multimedia information at the client station based on a first one of the plurality of execution control routines;

receiving the input signal from the input device of the client station, the input signal representing a user request;

determining an index based on the timer upon receipt of the input signal;

selecting a second one of the plurality of execution control routines based on the index; and displaying the multimedia information at the client station based on the second one of the plurality of execution control routines.

2. The method of claim 1 wherein the interactive media network is an interactive television network.

3. The method of claim 1 wherein the step of selecting a second one of the plurality of execution control routines includes the step of determining a program control memory address based on a lookup table.

4. The method of claim 1 wherein the step of determining an index includes the step of identifying the user request.

5. In an interactive media network including a plurality of user stations, each user station including a processor, a memory and an input device, a method for processing an input signal from the input device relating to streamed digital video data, the method comprising:

initializing a frame counter;

receiving streamed digital video data at the user station, the streamed digital video data representing multimedia information and having a plurality of execution control routines associated therewith;

updating the frame counter;

displaying the multimedia information at the user station based on a first one of the plurality of execution control routines;

receiving the input signal from the input device of the client station, the input signal representing a user request;

determining an index based on the frame counter upon receipt of the input signal;

selecting a second one of the plurality of execution control routines based on the index; and displaying the multimedia information at the client station based on the second one of the plurality of execution control routines.

6. The method of claim 5 wherein the interactive media is an interactive television network.

7. The method of claim 5 wherein the frame counter relates to intra picture frames.

8. The method of claim 5 wherein the frame counter relates to predicted picture frames.

9. The method of claim 5 wherein the step of selecting a second one of the plurality of execution control routines includes the step of determining a program control memory address based on a lookup table.

10. The method of claim 5 wherein the step of determining an index includes the step of identifying the user request.

11. In an interactive media network including a server and a client station, the client station including a processor, a memory and an input device, a system for processing an input signal from the input device relating to streamed digital video data, the system comprising:

means for initializing a timer;

means for transmitting streamed digital video data from the server to the client station, the streamed digital video data representing multimedia information and having a plurality of execution control routines associated therewith;

means for displaying the multimedia information at the client station based on a first one of the plurality of execution control routines;

means for receiving the input signal from the input device of the client station, the input signal representing a user request;

means for determining an index based on the timer upon receipt of the input signal;

means for selecting a second one of the plurality of execution control routines based on the index; and means for displaying the multimedia information at the client station based on the second one of the plurality of execution control routines.

12. The system of claim 11 wherein the means for selecting a second one of the plurality of execution control routines includes means for determining a program control memory address based on a lookup table.

13. The system of claim 11 wherein the means for determining an index includes means for identifying the user request.

14. In an interactive media network including a plurality of user stations, each user station including a processor, a memory and an input device, a system for processing an input signal from the input device relating to streamed digital video data, the system comprising:

means for initializing a frame counter;

means for receiving streamed digital video data at the user station, the streamed digital video data representing multimedia information and having a plurality of execution control routines associated therewith;

means for updating the frame counter;

means for displaying the multimedia information at the user station based on a first one of the plurality of execution control routines;

means for receiving the input signal from the input device of the client station, the input signal representing a user request;

means for determining an index based on the frame counter upon receipt of the input signal;

means for selecting a second one of the plurality of execution control routines based on the index; and means for displaying the multimedia information at the client station based on the second one of the plurality of execution control routines.

15. The system claim 14 wherein the frame counter relates to intra picture frames.

16. The system of claim 14 wherein the frame counter relates to predicted picture frames.

17. The system of claim 14 wherein the means for selecting a second one of the plurality of execution control routines includes means for determining a program control memory address based on a lookup table.

18. The system of claim 14 wherein the means for determining an index includes means for identifying the user request.

* * * * *